(12) United States Patent
Rzepniewski et al.

(10) Patent No.: US 9,034,273 B2
(45) Date of Patent: May 19, 2015

(54) SYSTEM AND METHOD FOR GASIFIER QUENCH RING

(75) Inventors: Karol Rzepniewski, Warsaw (PL); Allyson Joy Jimenez-Huyke, Houston, TX (US); Anna Renata Ziombra, Warsaw (PL); Slawomir Jozef Golec, Warsaw (PL)

(73) Assignee: General Electric Company, Schenectady, NY (US)

( * ) Notice: Subject to any disclaimer, the term of this patent is extended or adjusted under 35 U.S.C. 154(b) by 397 days.

(21) Appl. No.: 13/488,319

(22) Filed: Jun. 4, 2012

(65) Prior Publication Data

US 2013/0189165 A1    Jul. 25, 2013

(30) Foreign Application Priority Data

Jan. 19, 2012    (PL) .......................... 397847

(51) Int. Cl.
| | |
|---|---|
| *B01J 19/00* | (2006.01) |
| *B01J 7/00* | (2006.01) |
| *C10J 3/46* | (2006.01) |
| *C10J 3/48* | (2006.01) |
| *C10J 3/84* | (2006.01) |
| *C10J 3/74* | (2006.01) |

(52) U.S. Cl.
CPC *C10J 3/485* (2013.01); *C10J 3/845* (2013.01); *Y02E 20/16* (2013.01); *Y02E 20/18* (2013.01); *C10J 3/74* (2013.01); *C10J 2300/0956* (2013.01); *C10J 2300/0959* (2013.01); *C10J 2300/0976* (2013.01); *C10J 2300/0913* (2013.01)

(58) Field of Classification Search
CPC .............. C10J 3/847; C10J 3/46; C01J 19/00; B32D 17/04; B32D 17/64; B01J 7/00
USPC ..................... 422/198, 243; 29/428
See application file for complete search history.

(56) References Cited

U.S. PATENT DOCUMENTS

| | | | |
|---|---|---|---|
| 4,444,726 A | * | 4/1984 | Crotty et al. .................. 422/207 |
| 4,828,580 A | | 5/1989 | Dach |
| 4,880,438 A | | 11/1989 | Den Bleyker |
| 4,992,081 A | | 2/1991 | Den Bleyker |
| 7,846,226 B2 | | 12/2010 | Leininger et al. |
| 8,197,564 B2 | | 6/2012 | Jimenez-Huyke et al. |
| 2005/0132647 A1 | | 6/2005 | Groen |
| 2010/0325954 A1 | | 12/2010 | Tiwari et al. |
| 2012/0102835 A1 | | 5/2012 | Corry et al. |

FOREIGN PATENT DOCUMENTS

| | | |
|---|---|---|
| EP | 0160424 A2 * | 11/1985 |
| EP | 0202783 A2 | 11/1986 |

OTHER PUBLICATIONS

Search Report and Written Opinion from corresponding EP Application No. 13151954.8-1361 dated Apr. 4, 2013.

\* cited by examiner

*Primary Examiner* — Walter D Griffin
*Assistant Examiner* — Huy-Tram Nguyen
(74) *Attorney, Agent, or Firm* — Fletcher Yoder P.C.

(57) ABSTRACT

A system includes a quench ring assembly, which includes a quench ring, a throat ring coupled to the quench ring, and a dip tube coupled to the quench ring. The quench ring assembly is self-retained as a unit. The system also includes a support assembly configured to support the quench ring assembly. The support assembly includes a removable mount.

25 Claims, 3 Drawing Sheets

SYSTEM AND METHOD FOR GASIFIER QUENCH RING

CROSS-REFERENCE TO RELATED APPLICATION

This application claims priority to and benefit of Polish Patent Application No. P-397847 entitled "SYSTEM AND METHOD FOR GASIFIER QUENCH RING", filed Jan. 19, 2012, which is herein incorporated by reference in its entirety.

BACKGROUND OF THE INVENTION

The subject matter disclosed herein relates to gasifiers and, more particularly, systems and methods for the design of quench rings for gasifiers.

Gasifiers convert carbonaceous materials into a mixture of carbon monoxide and hydrogen, referred to as synthesis gas or syngas. For example, an integrated gasification combined cycle (IGCC) power plant includes one or more gasifiers that react a feedstock at a high temperature with oxygen and/or steam to produce syngas. Upon gasification, the resulting syngas may include less desirable components, such as ash. Accordingly, the syngas may be directed through a quench unit to cool the syngas to a saturation temperature and remove the less desirable components as a slag. However, the lifespan of certain components of the quench unit may be affected by exposure to the syngas and/or slag, which may reduce the efficiency and/or operating range of the gasifier.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system includes a quench ring assembly, which includes a quench ring, a throat ring coupled to the quench ring, and a dip tube coupled to the quench ring. The quench ring assembly is self-retained as a unit. The system also includes a support assembly configured to support the quench ring assembly. The support assembly includes a removable mount.

In a second embodiment, a system includes a gasifier and a quench ring assembly disposed in the gasifier. The quench ring assembly includes a quench ring, a throat ring coupled to the quench ring, and a dip tube coupled to the quench ring. The quench ring assembly is self-retained as a unit. The system also includes a support assembly configured to support the quench ring assembly in the gasifier. The support assembly includes a first flange support configured to concentrically surround at least a portion of the quench ring. The first flange support is coupled to a mounting plate of the gasifier. The support assembly also includes a second flange support configured to support the quench ring and couple to the first flange support.

In a third embodiment, a method includes coupling a throat ring and a dip tube to a quench ring to form a quench ring assembly that is self-retained as a unit. The method also includes coupling a first flange support to a mounting plate disposed in a gasifier, positioning the quench ring adjacent to the mounting plate and concentrically within the first flange support, positioning the second flange support adjacent to the first flange support and the quench ring, and coupling the first flange support to the second flange support.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

Figure 1:
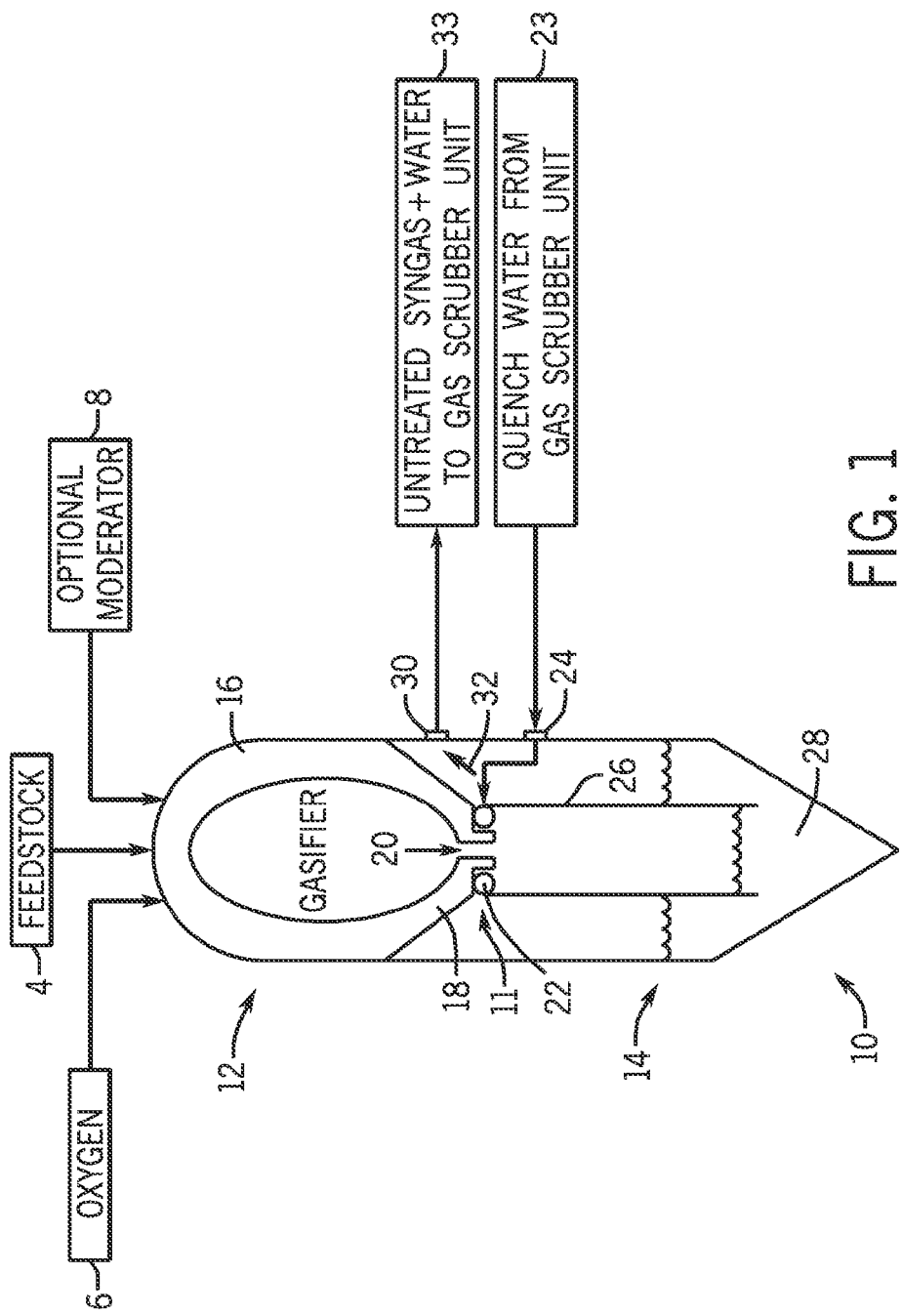
FIG. 1 is a schematic diagram of an exemplary embodiment of a gasifier incorporating a quench ring system.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

As discussed in detail below, the disclosed embodiments include quench ring systems that include a quench ring assembly and a support assembly configured to support the quench ring assembly. The quench ring assembly may include a quench ring, a throat ring (e.g., a hot face) coupled to the quench ring, and a dip tube coupled to the quench ring, which may all be coupled together as a self-retained unit or assembly. The self-retained assembly (quench ring assembly) may be described as a unit that may be installed and removed from a reactor, such as a gasifier, while the quench ring, the throat ring, and the dip tube remain coupled together. Furthermore, the support assembly may include a removable mount system configured to enable easy installation of the quench ring assembly (e.g., self-retained assembly). In certain embodiments, a reaction chamber may convert a feedstock into a synthetic gas, a quench chamber may cool the synthetic gas, and the quench ring provides a water flow to the quench chamber via the dip tube. These components of the quench ring assembly may be found in a reactor, gasifier, partial oxidation system, gas treatment unit, gas processing unit, or another similar system. The synthetic gas passing from the reaction chamber to the quench chamber may be at a high temperature, which may affect certain components of the gasifier. Thus, in certain embodiments, the gasifier includes the quench ring assembly to protect components of the gasifier from the synthetic gas and/or molten slag that may be produced in the reaction chamber. The synthetic gas and molten slag may collectively be referred to as hot products of gasification.

The support assembly may include a first flange support and a second flange support. The first flange support may surround at least a portion of the quench ring, and the second flange support may support the quench ring and couple to the first flange support. Thus, the support assembly may support the quench ring assembly in the gasifier. In addition, the support assembly may facilitate installation, removal, and maintenance of the quench ring assembly. For example, the quench ring assembly may be removed by uncoupling the second flange support from the first flange support. Thus, the quench ring assembly may be removed as one self-retained assembly from the gasifier after uncoupling of the second flange support. Accordingly, use of embodiments of the quench ring assembly and the support assembly may simplify assembly, maintenance, and disassembly of the quench ring system, thereby decreasing the time and costs associated with installation, removal, or maintenance of the quench ring system. In further embodiments, a method may include coupling the throat ring to the quench ring, coupling the dip tube to the quench ring, coupling the first flange support to a mounting plate disposed in the gasifier, positioning the quench ring adjacent to the mounting plate and concentrically within the first flange support, positioning the second flange support adjacent to the first flange support and the quench ring, and coupling the first flange support to the second flange support.

FIG. 1 is a schematic diagram of an exemplary embodiment of a gasifier 10, which may include a quench ring system 11. As discussed below, embodiments of the quench ring system 11 may include a quench ring, throat ring, and dip tube coupled together as a self-retained assembly. The gasifier 10 may be divided into a reaction chamber 12 and a quench chamber 14. In other embodiments, a synthetic gas cooler may be disposed between the reaction chamber 12 and the quench chamber 14. A protective barrier 16 may define the reaction chamber 12. The protective barrier 16 may act as a physical barrier, a thermal barrier, a chemical barrier, or any combination thereof. Examples of materials that may be used for the protective barrier 16 include, but are not limited to, refractory materials, refractory metals, non-metallic materials, clays, ceramics, cermets, and oxides of aluminum, silicon, magnesium, and calcium. In addition, the materials used for the protective barrier 16 may be bricks, castable refractory, coatings, or any combination thereof. A feedstock 4, along with oxygen 6 and an optional moderator 8, such as steam, may be introduced through one or more inlets (e.g., injectors) into the reaction chamber 12 of the gasifier 10 to be converted into a raw or untreated synthetic gas, e.g., a combination of carbon monoxide and hydrogen, which may also include slag and other contaminants. In certain embodiments, air or oxygen-rich air may be used instead of the oxygen 6. The untreated synthesis gas may also be described as untreated gas. The conversion in the gasifier 10 may be accomplished by subjecting the feedstock to steam and oxygen at elevated pressures, e.g., from approximately 20 bar to 100 bar, or 30 to 85 bar, and temperatures, e.g., approximately 1100 degrees C. to 1450 degrees C., depending on the type of gasifier 10 utilized. Under these conditions, the slag is in the molten state and is referred to as molten slag. In other embodiments, the molten slag may not be entirely in the molten state. For example, the molten slag may include solid (non-molten) particles suspended in molten slag.

The high-pressure, high-temperature untreated synthetic gas from the reaction chamber 12 may enter the quench chamber 14 through a bottom end 18 of the protective barrier 16, as illustrated by arrow 20. In other embodiments, the untreated synthetic gas passes through the syngas cooler before entering the quench chamber 14. In general, the quench chamber 14 may be used to reduce the temperature of the untreated synthetic gas. In certain embodiments, a quench ring 22, which may be a component of the quench ring system 11, may be located proximate to the bottom end 18 of the protective bather 16. The quench ring 22 is configured to provide quench water to the quench chamber 14. In certain embodiments, the configuration of the protective barrier 16 may help protect the quench ring 22 from the synthetic gas and/or molten slag. As illustrated, quench water 23 from a gas scrubber unit may be received through a quench water inlet 24 into the quench chamber 14. In general, the quench water 23 may flow through the quench ring 22 and down a dip tube 26 (e.g., an annular tube) into a quench chamber sump 28. The dip tube 26 may also be a component of the quench ring system 11. As such, the quench water 23 may cool the untreated synthetic gas, which may subsequently exit the quench chamber 14 through a synthetic gas outlet 30 after being cooled, as illustrated by arrow 32. In other embodiments, a coaxial draft tube may surround the dip tube 26 to create an annular passage through which the untreated synthetic gas may rise. The synthetic gas outlet 30 may generally be located separate from and above the quench chamber sump 28 and may be used to transfer the untreated synthetic gas and any water to the gas scrubber unit for treatment, as indicated by block 33. For example, the gas scrubber unit may remove fine solid particles and other contaminants. In addition, the gas scrubber unit may remove entrained water from the untreated synthetic gas, which may then be used as quench water 23 within the quench chamber 14 of the gasifier 10. The treated synthetic gas from the gas scrubber unit may ultimately be directed to a chemical process or a combustor of a gas turbine engine, for example.

Figure 2:
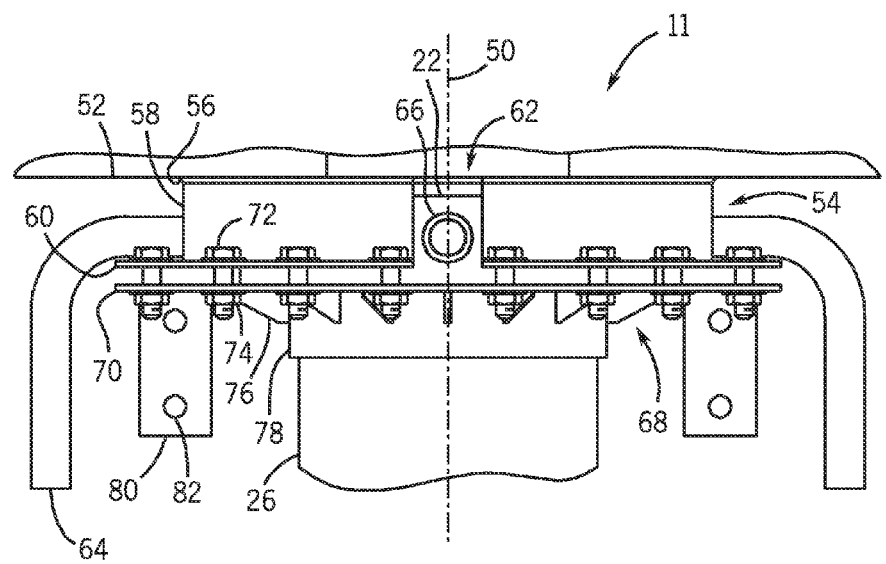
FIG. 2 is a side view of an embodiment of a quench ring system.

FIG. 2 is a side view of an embodiment of the quench ring system 11. As shown in FIG. 2, the quench ring system 11 is centered about an axial axis 50 of the gasifier 10. In addition, the quench ring system 11 may be coupled to a mounting plate 52 of the gasifier 10. The mounting plate 52 may be located in the bottom end 18 of the reaction chamber 12 and may be used to support the protective barrier 16, for example. A first flange support 54 of the quench ring system 11 may be coupled to the mounting plate 52 via a weld seam 56. In other embodiments, the first flange support 54 may be removably or fixedly coupled to the mounting plate 52 via bolts, welds, brazing, adhesives, clamps, threads, or any combination thereof. In further embodiments, the mounting plate 52 and the first flange support 54 may be formed from a single piece of metal (e.g., one piece). In certain embodiments, the first flange support 54 may include an annular portion 58 (e.g., a tube or a portion of a tube coaxial about the axis 50) and a disc portion 60 (e.g., a hollow disc-shaped plate or a portion of a hollow disc-shaped plate coaxial about the axis 50 and perpendicular to the axis 50). The annular and disc portions 58 and 60 may be coupled together via bolts, welds, brazing, adhesives, clamps, threads, or any combination thereof. In other embodiments, the annular and disc portions 58 and 60 may be formed from a single piece of metal. In certain embodiments, a plurality of first flange supports 54 (e.g., arranged in an annular ring) may be coupled to the mounting plate 52. The plurality of first flange supports 54 may concentrically surround the quench ring 22 (e.g., a hollow annular ring disposed about the axis 50). In addition, each pair of adjacent first flange supports 54 may be separated by a gap 62, which may enable a plurality of quench water inlet pipes 64 to couple with a plurality of quench water connections 66 (e.g., inlet ports) disposed on the quench ring 22. The quench water inlet pipes 64 may carry the quench water 23 to the quench ring 22. Thus, the quench water inlet pipes 64 may be coupled to the quench water inlet 24 of the gasifier 10. In certain embodiments, a set of four quench water inlet pipes 64 may be coupled to the quench ring 22 in an arrangement approximately equidistant from one another. In other embodiments, one, two, three, five, or more than six quench water inlet pipes 64 may be coupled to the quench ring 22.

In the illustrated embodiment, a second flange support 68 may support the quench ring 22 and couple to the first flange support 54. Specifically, the second flange support 68 may include a disc portion 70 (e.g., a hollow disc-shaped plate or a portion of a hollow disc-shaped plate coaxial about the axis 50 and perpendicular to the axis 50). Both the disc portion 60 of the first flange support 54 and the disc portion 70 of the second flange support 68 may include a plurality of holes through which bolts 72 may be used to removably couple the first flange support 54 to the second flange support 68. The bolts 72 may be secured using nuts 74 disposed against the second flange support 68. In other embodiments, the first flange support 54 may be removably coupled to the second flange support 68 via other removable coupling methods. A plurality of fillets 76 may be used to couple the disc portion 70 of the second flange support 68 to an annular portion 78 (e.g., a tube or a portion of a tube coaxial about the axis 50) of the second flange support 68. In other embodiments, the plurality of fillets 76 may be omitted. In addition, the disc portion 70, fillets 76 (if used), and annular portion 78 may be coupled together via bolts, welds, brazing, adhesives, clamps, threads, or any combination thereof. In other embodiments, the disc portion 70, fillets 76 (if used), and annular portion 78 may be formed from a single piece of metal. As shown in FIG. 2, the plurality of fillets 76 may be spaced evenly apart from one another and used to provide additional strength to the connection between the disc and annular portions 70 and 78 of the second flange support 68. In the illustrated embodiment, the annular portion 78 concentrically surrounds at least a portion of the dip tube 26 (e.g., annular tube). In certain embodiments, the second flange support 68 may include a plurality of second flange supports 68 (e.g., arranged in an annular ring) concentrically surrounding the dip tube 26. For example, in the illustrated embodiment, two second flange supports 68 (e.g., two 180 degree rings opposite from one another forming a 360 degree ring) each include two brackets 80, which may be used to couple the two adjacent second flange supports 68 to one another at an interface between the two second flange supports 68. The brackets 80 may be coupled together using bolts secured though holes 82 disposed in the brackets 80. In other embodiments, the plurality of second flange supports 68 may be coupled to one another via bolts, welds, brazing, adhesives, clamps, threads, or any combination thereof. In further embodiments, the second flange support 68 may be a one-piece support (e.g., annular support) completely surrounding the dip tube 26 and the brackets 80 may be omitted.

Figure 3:
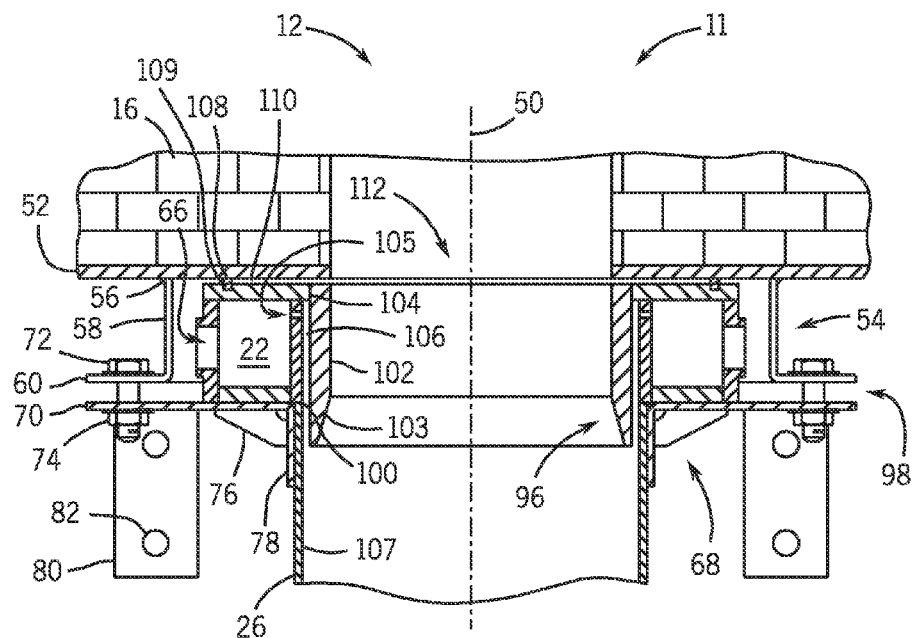
FIG. 3 is a cross-sectional view of an embodiment of a quench ring system.

FIG. 3 is a cross-sectional view of an embodiment of the quench ring system 11. The quench ring system 11 includes a quench ring assembly 96 and a support assembly 98. In certain embodiments, the support assembly 98 may be a removable mount that enables the quench ring assembly 96 to be quickly and easily installed or removed from the gasifier 10. For example, the support assembly 98 may include the first flange support 54 and the second flange support 68 discussed in detail above. Thus, the support assembly 98 enables the quench ring assembly 96 to be removably coupled, not fixedly coupled, within the gasifier 10. As shown in FIG. 3, the quench ring 22 is coupled to the dip tube 26 at a first connection 100. In certain embodiments, the connection first 100 may be made via bolts, welds, brazing, adhesives, clamps, threads, or any combination thereof. In other embodiments, the quench ring 22 and the dip tube 26 may be integrally formed as one piece. A throat ring (e.g., an annular ring with an inner annular surface or hot face facing the axis 50) 102 may be coupled to the quench ring 22 at a second connection 104, which may be made via bolts, welds, brazing, adhesives, clamps, threads, or any combination thereof. In certain embodiments, the quench ring 22, dip tube 26, and/or throat ring 102 may be integrally formed as one piece. The throat ring 102 may help protect the quench ring 22 from direct contact with the hot products of gasification from the reaction chamber 12. In certain embodiments, the throat ring 102 may include a beveled face 103 (e.g., conical inner surface) that diverges away from the axis 50 in the flow direction 20 from the reaction chamber 12 to the quench chamber 14. Together, the quench ring 22, throat ring 102, and dip tube 26 may constitute the quench ring assembly 96 (e.g., self-retained assembly or unit). As shown in FIG. 3, quench water 23 may enter the quench ring 22 through the quench ring connection 66 via the quench water inlet pipe 64 (see FIG. 2). The quench water 23 may exit from the quench ring 22 through one or more quench ring slots 105 (e.g., an inner annular slot disposed about the axis 50). In certain embodiments, the quench ring 22 may include a plurality of quench ring slots 105 spaced apart from one another in an annular configuration about the axis 50. The quench water 23 may then travel through a gap 106 (e.g., an annular gap) between the quench ring 22 and the throat ring 102 to flow downward along the dip tube 26 (e.g., along inner annular surface 107) toward the quench chamber 14. Thus, the quench water 23 may substantially or completely cover the surface 107 of the dip tube 26, thereby helping to protect the dip tube 26 from the hot products of gasification.

In the illustrated embodiment, a gasket 108 (e.g., an annular ring) may be disposed between the quench ring 22 and the mounting plate 52. Specifically, the gasket 108 may be disposed in a gasket slot 109 formed at a mounting interface of the quench ring 22 (e.g., interface between the mounting plate 52 and the quench ring 22). For example, the gasket slot 109 may be located on the surface of the quench ring 22 facing the mounting plate 52. The gasket 108 may help to block the quench ring 22 and the support assembly 98 from exposure to the hot products of gasification that might enter through a gap 110 between the quench ring 22 and the mounting plate 52. Thus, the gasket 108 may be made from materials designed to be exposed to the hot products of gasification. In addition, the size of the gap 110 may be reduced by tightening the connection between the first flange support 54 and the second flange support 68, thereby compressing the gasket 108. In addition, as shown in FIG. 3, the quench ring 22 is not directly coupled to the gasifier 10. For example, the quench ring 22 is not directly coupled to the mounting plate 52. Instead, the quench ring 22 is supported in the support assembly 98 (e.g., between the first flange support 54 and the second flange support 68). Thus, the quench ring 22, and the other components of the quench ring assembly 96, may be easily and quickly removed from the gasifier 10 only by uncoupling or disassembling the support assembly 98.

Figure 4:
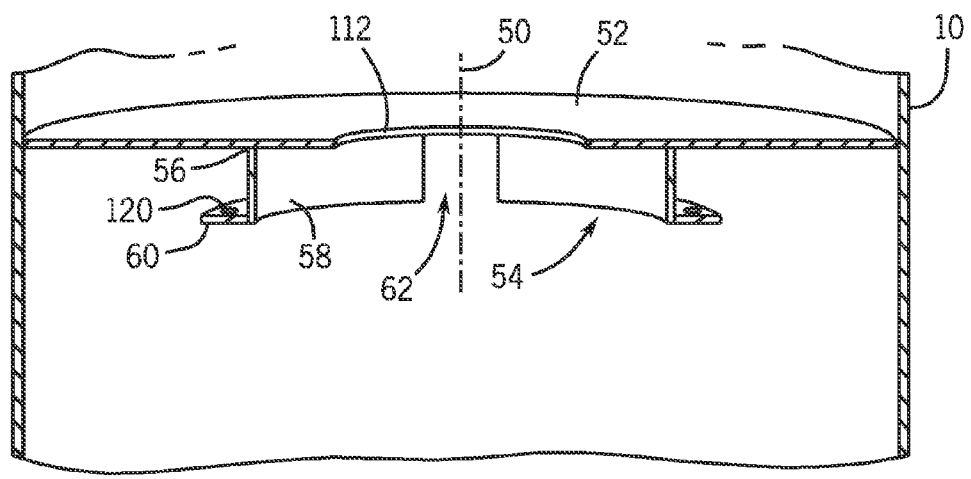
FIG. 4 is a perspective view of a first step in the assembly of an embodiment of a quench ring system.

FIG. 4 is a perspective view of a first step that may be used to assemble an embodiment of the quench ring system 11. Specifically, the plurality of first flange supports 54 may be welded to the mounting plate 52 along the weld seam 56. In other embodiments, the plurality of first flange supports 54 and the mounting plate 52 may be a one-piece structure. As shown in FIG. 4, the first flange supports 54 may be arranged concentrically about an opening 112 through the mounting plate 52, which is centered about the axial axis 50. As illustrated, each first flange support 54 may be an arcuate segment (e.g., portion of cylinder) such that the supports 54 collectively define an annular arrangement about the axis 50. The hot products of gasification from the reaction chamber 12 may pass through the opening 112 in the mounting plate 52. In addition, the first flange supports 54 may be separated by the gaps 62 to accommodate the quench water inlet pipes 64. As shown in FIG. 4, holes 120 may be formed in the disc portions 60 of the first flange supports 54 to accommodate the bolts 70 used later during assembly of the quench ring system 11.

Figure 5:
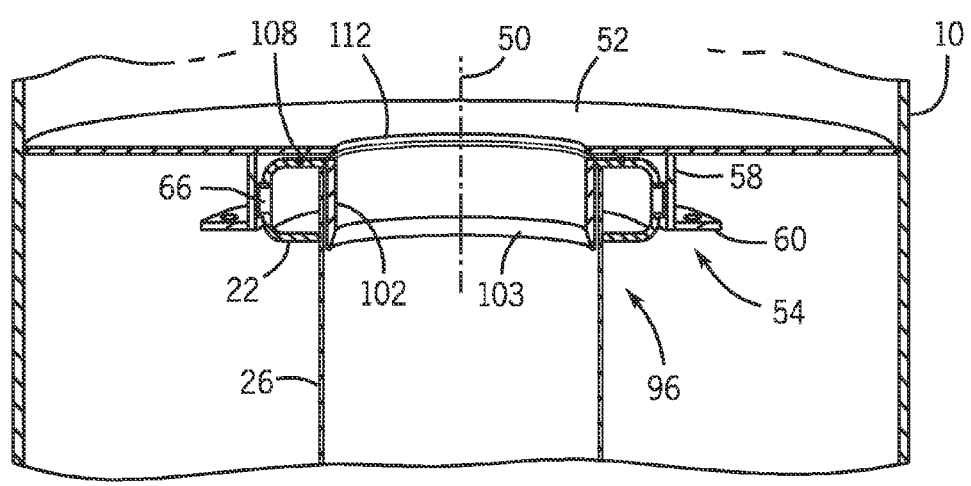
FIG. 5 is a perspective view of a second step in the assembly of an embodiment of a quench ring system.

FIG. 5 is a perspective view of a second step that may be used to assemble an embodiment of the quench ring system 11. In the illustrated embodiment, the quench ring assembly 96 has already been fabricated as a self-retained assembly (or unit), for example, outside of the gasifier 10. Specifically, the quench ring 22 may be removably or fixedly coupled to the dip tube 26 and the throat ring 102 to form the quench ring assembly 96. Thus, the quench ring assembly 96 may be installed and removed from the gasifier 10 as a unit, wherein the dip tube 26, throat ring 102, and quench ring 22 remain coupled together during installation and removal. As shown in FIG. 5, the gasket 108 (e.g., o-ring) is disposed on the quench ring 22 and the quench ring assembly 96 is positioned adjacent to the mounting plate 52 within the first flange supports 54. In other words, the first flange supports 54 concentrically surround the quench ring assembly 96. As described above, the gasket 108 separates the quench ring 22 from the mounting plate 52 by the gap 110.

Figure 6:
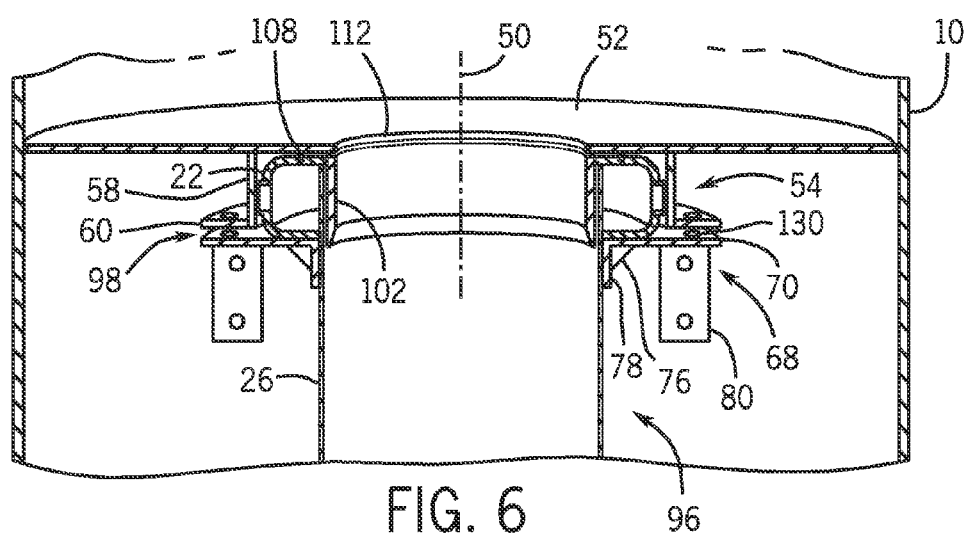
FIG. 6 is a perspective view of a third step in the assembly of an embodiment of a quench ring system.

FIG. 6 illustrates a third step that may be used to assemble an embodiment of the quench ring system 11. Specifically, the plurality of second flange supports 68 may be placed adjacent to the first flange supports 54 and concentrically surrounding the dip tube 26. The plurality of second flange supports 68 may then be coupled to one another using the brackets 80. In other embodiments, a single one-piece second flange support 68 may be placed concentrically surrounding a bottom end portion of the dip tube 26, and then moved upward and adjacent to the first flange supports 54. Bolts 72 (see FIG. 2) may be passed through the holes 120 in the first flange supports 54 and holes 130 in the second flange supports 68. Nuts 74 (see FIG. 2) may then be attached to the bolts 72 and tightened to bring the first flange supports 54 toward the second flange supports 68, thereby compressing the gasket 108. The quench ring system 11 may then be ready to be placed into service. In addition, the disassembly and removal of the quench ring assembly 96 from the gasifier 10 may be accomplished by performing the previous steps in reverse order. Specifically, the second flange supports 68 may be disconnected from the first flange supports 54, thereby enabling removal of the quench ring assembly 96. Thus, maintenance and repair of the quench ring assembly 96 may be facilitated by the simple removal of the self-retained assembly of the quench ring assembly 96 using the support assembly 98.

As disclosed above, certain embodiments of the quench ring system 11 include the self-retained assembly of the quench ring assembly 96 and the support assembly 98. The quench ring assembly 96 may include the quench ring 22, throat ring 102, and dip tube 26 fixedly or removably coupled together as the self-retained assembly. In addition, the support assembly 98 may include the first and second flange supports 54 and 68 that support the quench ring 22 when coupled together. By using the support assembly 98, the quench ring assembly 96 may be easily installed or removed from the gasifier 10 without having to cut or weld any parts. Instead, the first and second flange supports 54 and 68 may simply be coupled together or uncoupled to enable installation or removal of the quench ring assembly 96. In addition, the quench ring assembly 96 enables the quench ring 22, throat ring 102, and dip tube 26 to be installed or removed from the gasifier 10 as a single self-retained unit rather than installing or removing each separately from the gasifier 10. Thus, embodiments of the quench ring system 11 may reduce the time and costs associated with the installation, maintenance, or removal of the quench ring 22, throat ring 102, and/or dip tube 26.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system, comprising:
 a quench ring assembly, comprising:
  a quench ring;
  a throat ring coupled to the quench ring; and
  a dip tube coupled to the quench ring, wherein the quench ring assembly is self-retained as a unit enclosing a passage through the quench ring; and
 a support assembly configured to support the quench ring assembly, wherein the support assembly comprises a removable mount.

2. The system of claim 1, wherein the removable mount comprises:
 a first flange support configured to concentrically surround at least a portion of the quench ring; and
 a second flange support configured to support the quench ring and couple to the first flange support.

3. The system of claim 1, wherein the quench ring comprises a gasket slot formed at a mounting interface of the quench ring.

4. The system of claim 3, comprising a gasket disposed in the gasket slot.

5. The system of claim 1, wherein the throat ring is fixedly coupled to the quench ring, and the dip tube is fixedly coupled to the quench ring.

6. The system of claim 1, wherein the quench ring, throat ring, and dip tube are integrally formed as one piece.

7. The system of claim 1, comprising a reactor, wherein the quench ring assembly and the support assembly are disposed in the reactor.

8. The system of claim 7, wherein the reactor comprises a gasifier.

9. The system of claim 7, wherein the quench ring is not fixedly coupled within the reactor.

10. The system of claim 1, wherein the first flange support comprises a plurality of arcuate first flange supports.

11. The system of claim 1, wherein the quench ring comprises axially opposite top and bottom walls fixedly coupled to radially opposite inner and outer side walls.

12. The system of claim 11, wherein the throat ring is disposed about the quench ring with an intermediate annular gap, wherein the quench ring comprises a quench ring slot in fluid communication with the intermediate annular gap.

13. The system of claim 11, wherein the quench ring comprises a radial fluid port disposed in the outer side wall.

14. The system of claim 11, wherein the support assembly comprises a flange support extending along the bottom wall of the quench ring.

15. The system of claim 14, wherein the flange support is coupled to the dip tube, and the flange support extends radially outward beyond the outer side wall of the quench ring.

16. A system, comprising:
- a gasifier;
- a quench ring assembly disposed in the gasifier, wherein the quench ring assembly comprises:
  - a quench ring;
  - a throat ring coupled to the quench ring; and
  - a dip tube coupled to the quench ring, wherein the quench ring assembly is self-retained as a unit enclosing a passage through the quench ring; and
- a support assembly configured to support the quench ring assembly in the gasifier, wherein the support assembly comprises:
  - a first flange support configured to concentrically surround at least a portion of the quench ring, wherein the first flange support is coupled to a mounting plate of the gasifier; and
  - a second flange support configured to support the quench ring and couple to the first flange support.

17. The system of claim 16, wherein the quench ring comprises a gasket slot formed at a mounting interface between the quench ring and the mounting plate.

18. The system of claim 17, comprising a gasket disposed in the gasket slot, wherein the gasket is disposed at the mounting interface.

19. The system of claim 16, wherein the throat ring is fixedly coupled to the quench ring, and the dip tube is fixedly coupled to the quench ring.

20. The system of claim 16, wherein the quench ring is removably coupled within the gasifier.

21. A method, comprising:
- coupling a throat ring and a dip tube to a quench ring to form a quench ring assembly that is self-retained as a unit enclosing a passage through the quench ring;
- coupling a first flange support to a mounting plate disposed in a gasifier;
- positioning the quench ring adjacent to the mounting plate and concentrically within the first flange support;
- positioning the second flange support adjacent to the first flange support and the quench ring; and
- coupling the first flange support to the second flange support.

22. The method of claim 21, comprising disposing a gasket at a mounting interface of the quench ring prior to positioning the quench ring adjacent to the mounting plate.

23. The method of claim 21, wherein coupling the throat ring and the dip tube to the quench ring to form a quench ring assembly comprises fixedly coupling the throat ring and the dip tube to the quench ring.

24. The method of claim 21, wherein the first flange support comprises a plurality of first flange supports.

25. The method of claim 24, comprising coupling a plurality of quench water inlet pipes to the quench ring, wherein each of the plurality of quench water inlet pipes is configured to extend through a gap between two of the plurality of first flange supports.

* * * * *

UNITED STATES PATENT AND TRADEMARK OFFICE
CERTIFICATE OF CORRECTION

PATENT NO. : 9,034,273 B2
APPLICATION NO. : 13/488319
DATED : May 19, 2015
INVENTOR(S) : Rzepniewski et al.

Page 1 of 1

It is certified that error appears in the above-identified patent and that said Letters Patent is hereby corrected as shown below:

In the specification

In Column 4, Line 13, delete "bather 16." and insert -- barrier 16. --, therefor.

Signed and Sealed this
First Day of December, 2015

Michelle K. Lee
*Director of the United States Patent and Trademark Office*